United States Patent
Paniconi et al.

(10) Patent No.: US 9,094,663 B1
(45) Date of Patent: Jul. 28, 2015

(54) SYSTEM AND METHOD FOR PROVIDING ADAPTIVE MEDIA OPTIMIZATION

(71) Applicant: Google Inc., Mountain View, CA (US)

(72) Inventors: Marco Paniconi, Campbell, CA (US); Ermin Kozica, Nacka (SE)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/319,491

(22) Filed: Jun. 30, 2014

Related U.S. Application Data

(63) Continuation of application No. 13/103,494, filed on May 9, 2011, now Pat. No. 8,767,821.

(51) Int. Cl.
| | |
|---|---|
| H04N 7/26 | (2006.01) |
| H04N 19/169 | (2014.01) |
| H04N 19/164 | (2014.01) |
| H04N 19/196 | (2014.01) |
| H04N 19/115 | (2014.01) |

(52) U.S. Cl.
CPC ..... H04N 19/00327 (2013.01); H04N 19/0006 (2013.01); H04N 19/00236 (2013.01); H04N 19/00369 (2013.01)

(58) Field of Classification Search
CPC .................................. H04N 19/00242
USPC ....................................... 375/240
See application file for complete search history.

(56) References Cited

U.S. PATENT DOCUMENTS

| | | |
|---|---|---|
| 5,675,384 A | 10/1997 | Ramamurthy et al. |
| 6,141,053 A | 10/2000 | Saukkonen |
| 6,404,738 B1 | 6/2002 | Reininger et al. |
| 6,411,602 B2 | 6/2002 | Schoenblum et al. |
| 6,456,591 B1 | 9/2002 | Mishra |
| 6,535,238 B1 | 3/2003 | Kressin |
| 6,732,323 B1 | 5/2004 | Mitlin et al. |

(Continued)

FOREIGN PATENT DOCUMENTS

| | | |
|---|---|---|
| WO | WO0233979 | 4/2002 |
| WO | WO02062072 | 8/2002 |

(Continued)

OTHER PUBLICATIONS

Akyol et al., "Content-Aware Scalability-Type selection for Rate Adaptation of scalable Video, "EURASIP Journal on Advances in Signal Processing, Hindawi Publishing Corporation, vol. 2007, 11 pages.

(Continued)

*Primary Examiner* — Andy Rao
*Assistant Examiner* — Tyler Edwards
(74) *Attorney, Agent, or Firm* — Young Basile Hanlon & MacFarlane P.C.

(57) ABSTRACT

Adaptive media optimization is described. Aspects of the invention modify video encoding and network transmission settings to optimize the user viewing experience. The system and method sample video content to determine various content features of the video. The system and method use the identified content features in conjunction with network statistics to modify encoding settings and network transmission options to ensure a minimum of interruption in the transmitted video. Previously generated lookup tables ensure efficient mapping of video content and network conditions to encoding and transmission settings.

20 Claims, 6 Drawing Sheets

(56) References Cited

U.S. PATENT DOCUMENTS

| | | |
|---|---|---|
| 6,771,703 B1 | 8/2004 | Oguz et al. |
| 6,937,770 B1 | 8/2005 | Oguz et al. |
| 7,584,475 B1 | 9/2009 | Lightstone et al. |
| 8,018,850 B2 | 9/2011 | van Beek et al. |
| 2006/0062481 A1 | 3/2006 | Suvanto |
| 2006/0188014 A1 | 8/2006 | Civanlar et al. |
| 2006/0222078 A1 | 10/2006 | Raveendran |
| 2006/0285598 A1 | 12/2006 | Tulkki |
| 2007/0009034 A1 | 1/2007 | Tulkki |
| 2009/0219990 A1 | 9/2009 | Han et al. |
| 2010/0272173 A1 | 10/2010 | Puri et al. |
| 2011/0058605 A1 | 3/2011 | Ma |
| 2012/0230390 A1* | 9/2012 | Akkor ...................... 375/240.02 |
| 2012/0275511 A1 | 11/2012 | Shemer et al. |

FOREIGN PATENT DOCUMENTS

| | | |
|---|---|---|
| WO | WO02067590 | 8/2002 |
| WO | WO02078327 | 10/2002 |
| WO | WO03043342 | 5/2003 |

OTHER PUBLICATIONS

Bruckstein et al. "Down-Scaling for Better Transform Compression, "IEEE Transactions of image processing, vol. 12, No. 9 Sep. 2003, pp. 1132-1144.

Garcia et al., "Towards a Content-Based Parametric Video Quality Model for IPTV," Date unknown, 5 pages.

Hartanto et al., Local and Metropolitian Area Networks, 1999. Selected Papers. 10th IEEE Workshop, 126-132 (1999).

Huynh-Thu et al., "Impact of Jitter and Jerkiness on Perceived Video Quality, "Date Unknown, 6 pages.

Internatiional Search Report dated Feb. 16, 2007, from corresponding PCT Application.

Li et al., "Content-Aware Playout and Packet Scheduling for Video Streaming Over Wireless Links, "Multimedia, IEEE Transactions, vol. 10 Issue 5, Aug. 2008, pp. 885-895.

Lin et al., "Adaptive Downsampling to Improve Image Compression at Low Bite Rates, " IEEE Transactions on Image Processing, Vol. 15, No. 9 Sep. 2006, pp. 2513-2521.

McCarthy et al., "Sharp or Smooth? Comparing the effects of quantization vs. frame rate for streamed video, "CHI, 2004, Apr. 24-29, 2004, Vienna, Austria, 8 pages.

Murat A. Tekalp, "Block-Based Methods", Digital Video Processing, Prentice Hall Processing Series, Aug. 12, 1995, pp. 98-116, Prentice Hall PTR.

Nguyen et al., "Adaptive Downsampling/Upsampling for Better Video Compression at Low Bite Rate," IEEE, 2008, pp. 1624-1627.

Qu et al, Vehicular Technology Conference, VTC 2003—Fall. 2003 IEEE 58th, vol. 5; 3395-3399 (2003).

Reed et al., "Optimal Multidimensional Bit-Rate Control for Video Communication," IEEE Transactions on Image Processing, 2002, pp. 873-885.

Ries et al., "Content Based Video Quality Estimation for H.264/AVC Video Streaming," Date Unknown, 6 Pages.

Vasudev Bhaskaran et al., "Chapter 6: The MPEG Video Standards", Image and Video Compression Standards—Algorithms & Architectures, Second Edition, 1997, pp. 149-230 Kluwer Academic Publishers.

Vetro et al., "Rate-Distortion Optimized Video Coding Considering Frameskip," Date Unknown, 4 pages.

Wang et al., "Classification-Based Multi-Dimensional Adaptation Prediction for Scalable Video Coding Using Subjective Quality Evaluation," Date unknown, 10 pages.

Wang et al., "Modeling Rate and Perceptual Quality of Scalable Video as Functions of Quantization and Frame Rate and Its Application in Scalable Video Adaptation," Date Unknown, 9 Pages.

Wen et al. 2005 IEEE International conference on multimedia and Expo, 4 pages. (2006).

Yuk et al., IEEE Transactions on multimedia, 3(3); 366-374 (2001).

Zhai et al., IEEE Transactions on Image Processing, 15(1); 40-53 (2006).

* cited by examiner

SYSTEM AND METHOD FOR PROVIDING ADAPTIVE MEDIA OPTIMIZATION

CROSS-REFERENCE TO RELATED APPLICATION

This application is a continuation of U.S. application Ser. No. 13/103,494, filed May 9, 2011, the entire content of which is incorporated herein by reference in its entirety.

BACKGROUND

Increased access to high speed computer networks has led to an explosion in multimedia content available to modern users. In the course of a typical browsing session, the user may view images, listen to audio, and watch video. Each of these media types may be provided in various encoding formats to optimize the viewing experience for the user. Some content is provided in multiple formats, such that a user can select the most appropriate for their individual situation. For example, a video may be provided in both high definition (HD) and standard definition (SD) formats. A user with a slower connection may opt to view the video in SD format to reduce the delay while waiting for the video to load.

However, not all such decisions are straightforward. Different video formats and encoding methods may be optimal for some media, but not others, based on the content of the media. Network conditions may fluctuate, resulting in a particular format being optimal some times, but not others. A user may not be sophisticated enough to select an appropriate format for his/her system capabilities.

BRIEF SUMMARY

Aspects of the invention described herein modify video encoding and network transmission settings to optimize the user viewing experience, also called adaptive media optimization herein.

An apparatus incorporating the teachings herein includes memory and a processor. The processor is configured to execute instructions stored in the memory to determine a content class of a portion of a video stream based on one or more content characteristics of the portion of the video stream, determine a set of network statistics for a network over which the video stream is to be transmitted, configure at least one encoding setting used to encode the portion of the video stream into a format for packetization using at least one lookup table mapping the content class and at least one network statistic of the set of network statistics to the at least one encoding setting, configure at least one transmission setting used to packetize and transmit the video after encoding using at least one lookup table mapping the content class and at least one network statistic of the set of network statistics to the at least one transmission setting, encode the portion of the video stream in accordance with the at least one encoding setting, and transmit the encoded portion of the video stream in accordance with the at least one transmission setting.

One method described herein includes determining a content class of a portion of a video stream based on one or more content characteristics of the portion of the video stream, determining a set of network statistics for a network over which the video stream is to be transmitted, configuring at least one encoding setting used to encode the portion of the video stream into a format for packetization using at least one lookup table mapping the content class and at least one network statistic of the set of network statistics to the at least one encoding setting, configuring at least one transmission setting used to packetize and transmit the video after encoding using at least one lookup table mapping the content class and at least one network statistic of the set of network statistics to the at least one transmission setting, encoding the portion of the video stream in accordance with the at least one encoding setting, and transmitting the encoded portion of the video stream in accordance with the at least one transmission setting.

Variations in these and other implementations of the teachings herein are described below with reference to the drawing figures.

DETAILED DESCRIPTION

According to the adaptive media optimization described herein, video content may be sampled to determine various content features of the video. The identified content features are used in conjunction with network statistics to modify encoding settings and network transmission options to ensure a minimum of interruption in the transmitted video. Previously generated lookup tables ensure efficient mapping of video content and network conditions to encoding and transmission settings. The use of lookup tables in this manner allows for the application of the teachings herein to real-time operations.

Figure 1:
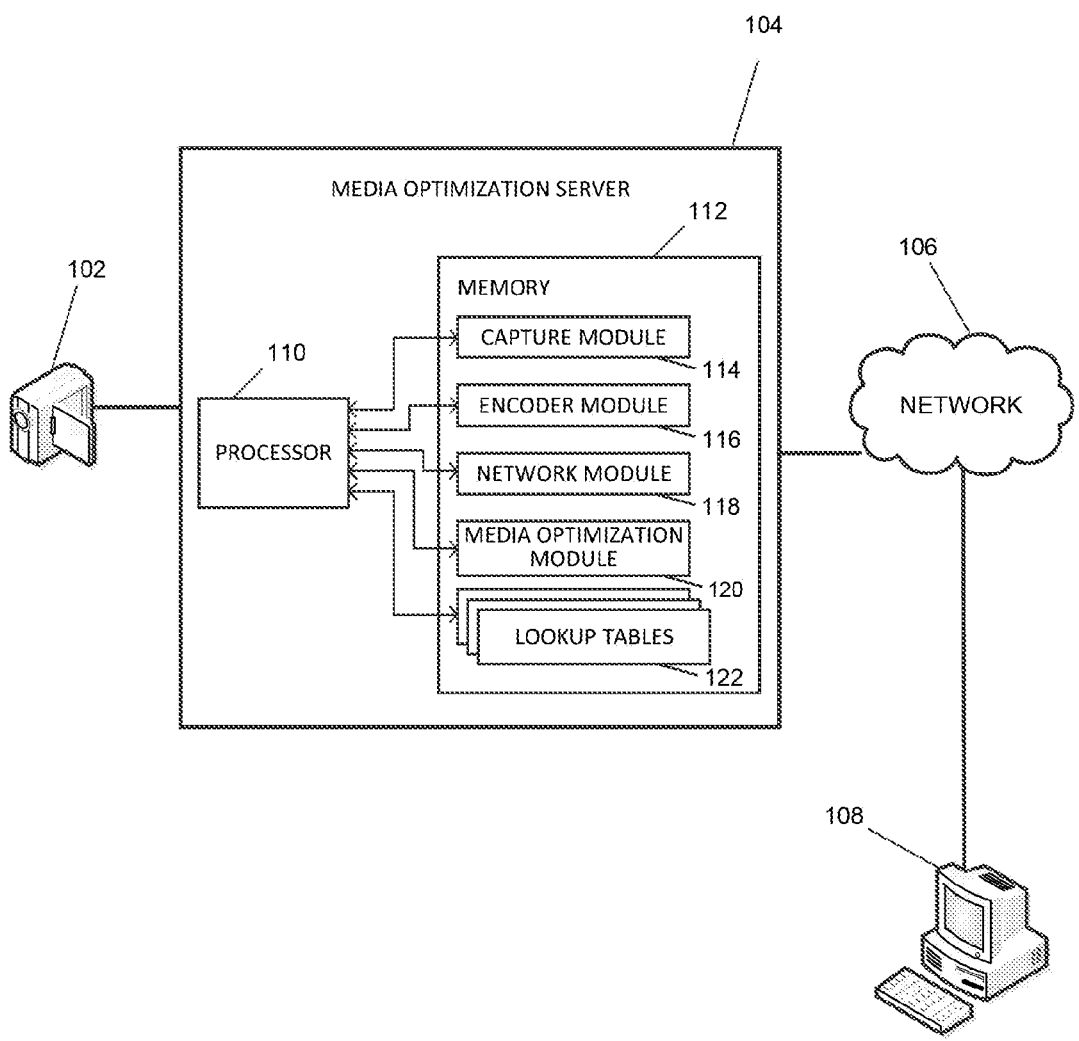
FIG. 1 is a system diagram depicting a server in communication with a video source and a client device in accordance with aspects of the invention.

As shown in FIG. 1, a system or apparatus 100 in accordance with one aspect of the invention includes a video source 102, a media optimization server 104, a network 106 and a client device 108. Media optimization server 104 receives video data from video source 102, and encodes and transmits to the video to client device 108 via network 106. The encoding and transmission processes are optimized based upon the content of the source video and various network conditions. Such optimization is described in further detail below with respect to FIGS. 2-6.

Video source 102 may be any device capable of capturing or transmitting a video image. For example, the video source may be a digital camera, a digital camcorder, a computer server, a webcam, a mobile phone, a personal digital assistant, or any other device capable of capturing or transmitting video. In some aspects, the media optimization server 104 may receive audio and/or video from multiple video sources 102, and combine the sources into a single stream.

Media optimization server 104 may include a processor 110, a memory 112 and other components typically present in general purpose computers. Memory 112 may store instructions and data that are accessible by processor 110. Processor 110 may execute the instructions and access the data to control the operations of media optimization server 104.

Memory 112 may be any type of memory operative to store information accessible by processor 110, including a computer-readable medium, or other medium that stores data that may be read with the aid of an electronic device, such as a hard-drive, memory card, read-only memory (ROM), random access memory (RAM), digital versatile disc (DVD) or other optical disks, as well as other write-capable and read-only memories. Implementations of the present invention may use different combinations of the foregoing, whereby different portions of the instructions and data are stored on different types of media.

The instructions may be any set of instructions to be executed directly (such as machine code) or indirectly (such as scripts) by processor 110. For example, the instructions may be stored as computer code on a tangible computer-readable medium. In that regard, the terms "instructions" and "programs" may be used interchangeably herein. The instructions may be stored in object code format for direct processing by processor 110, or in any other computer language including scripts or collections of independent source code modules that are interpreted on demand or compiled in advance. Functions, methods, and routines of the instructions are explained in more detail below with respect to FIGS. 2-6.

Data may be retrieved, stored or modified by processor 110 in accordance with the instructions. For instance, although the architecture is not limited by any particular data structure, in a relational the data may be stored in computer registers, database as a table having a plurality of fields and records, Extensible Markup Language (XML) documents or flat files. The data may also be formatted in any computer readable format such as, but not limited to, binary values or Unicode. By further way of example only, image data may be stored as bitmaps made up of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may include any information sufficient to identify the relevant information, such as numbers, descriptive text, proprietary codes, references to data stored in other areas of the same memory or different memories (including other network locations) or information that is used by a function to calculate the relevant data.

Processor 110 may be any well-known processor, such as processors from Intel Corporation or AMD. Alternatively, processor 110 may be a dedicated controller such as an application-specific integrated circuit (ASIC). Processor 110 may also be a programmable logic device (PLD) such as a field programmable gate array (FPGA).

Although FIG. 1 functionally illustrates processor 110 and memory 112 as each being within a single block, it should be understood that processor 110 and memory 112 may actually include multiple processors and memories that may or may not be stored within the same physical housing. Accordingly, references to a processor, computer, or memory will be understood to include references to a collection of processors, computers, or memories that may or may not operate in parallel.

Media optimization server 104 may be at one node of a network and be operative to directly and indirectly communicate with other nodes of the network. For example, media optimization server 104 may include a web server that is operative to communicate with a client device via network 106 such that the media optimization server 104 uses the network 106 to transmit and display information to a user on a display of the client device. While the concepts described herein are generally discussed with respect to media optimization server 104, aspects of the invention may be applied to any computing node capable of managing media encoding operations.

In order to facilitate the media optimization operations of media optimization server 104, memory 112 may further include a capture module 114, an encoder module 116, a network module 118, a media optimization module 120 and a set of lookup tables 122.

Capture module 114 receives incoming data from video source 102. For example, capture module 114 may be a driver application interfacing with a web cam device, a server application receiving data from a client device transmitting a video stream, an application receiving an encoded video file from a remote source, and the like. Capture module 114 operates to accept the data from video source 102 and send a sample of the video data to media optimization module 120.

Encoder module 116 manages the process by which the video received via capture module 114 is processed into a format suitable for packetization and transmission by network module 116. Encoder module 116 receives instructions from media optimization module 120 to configure the encoding operations, such as the format, the source encoding rate, the frame rate, the spatial resolution, and the Error Resilience (ER) settings associated with the video. ER is an encoder feature that forces intra-coding for some macro-blocks on P-frames (delta frames). ER settings determine the amount of macro-block encoding present on the P-frames. By encoding extra data into the P-frames, ER allows for the ability to reduce error propagation in the event of errors (such as those caused by dropped or delayed packets) in one or more previous and/or subsequent frames.

Network module 118 manages the packetization and transmission of the video as encoded by encoder module 116. Network module 118 receives instructions from media optimization module 120 to configure the network parameters, such as the Forward Error Correction (FEC) protection/rate, and whether or not a negative acknowledgement character (NACK) method is used to verify that a packet has been received by a client device. FEC methods generally operate to send extra/redundant packets to enable the receiver to recover lost packets. A traditional NACK method operates by sending a notification to a sender whenever the receiver has failed to receive a data packet, either due to a timeout or receiving a next packet out of order. When the receiver sends such a notification (a NACK), the server retransmits the packet to the receiver.

Media optimization module 120 manages the encoding, packetization and transmission operations as performed by encoder module 116 and network module 118. Media optimization module 120 receives a sample of video data from capture module 114 and a set of network statistics, performs an analysis on the video sample and the network statistics using a set of lookup tables 122, and then instructs encoder module 116 and network module 118 based on the analysis. Exemplary methods by which this analysis may be performed are described below Lookup tables 122 include a set of configuration parameters that are indexed by a set of video content features and network statistics. Lookup tables 122 are referenced by media optimization module 120 to configure the settings of encoder module 116 and network module 118. In some aspects, media optimization module 120 accesses three separate lookup tables 122 to configure the video encoding and transmission operations. These tables may include a Residual Packet Loss ("RPL") table, a video parameter table and a forward error correction table. Methods for generating these tables are described further below.

Client device 108 is operable to store and/or display video content as received from media optimization server 104. Client device 108 may be any device capable of managing data requests via network 106. Examples of such client devices include a personal computer (PC), a mobile device, or a server. Client device 108 may also include a personal digital assistant (PDA), a tablet PC, a netbook, a smart phone, etc. Indeed, client devices usable with the teachings herein may include any device operative to process instructions and transmit data to and from humans and other computers such as general purpose computers, network computers lacking local storage capability, etc.

Network 106, and the intervening nodes between server 104 and client device 108 may include various configurations and use various protocols such as the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol (HTTP), simple mail transfer protocol (SMTP), and various combinations of the foregoing. While only one client device 108 and server 104 are shown in FIG. 1, it should be appreciated that a large number of connected computers may be included on the system.

Although certain advantages are obtained when information is transmitted or received as noted above, other aspects of the teachings herein are not limited to any particular manner of transmission of information. For example, in some aspects, information may be sent via a medium such as an optical disk or portable drive. In other aspects, the information may be transmitted in a non-electronic format and manually entered into the system.

Figure 2:
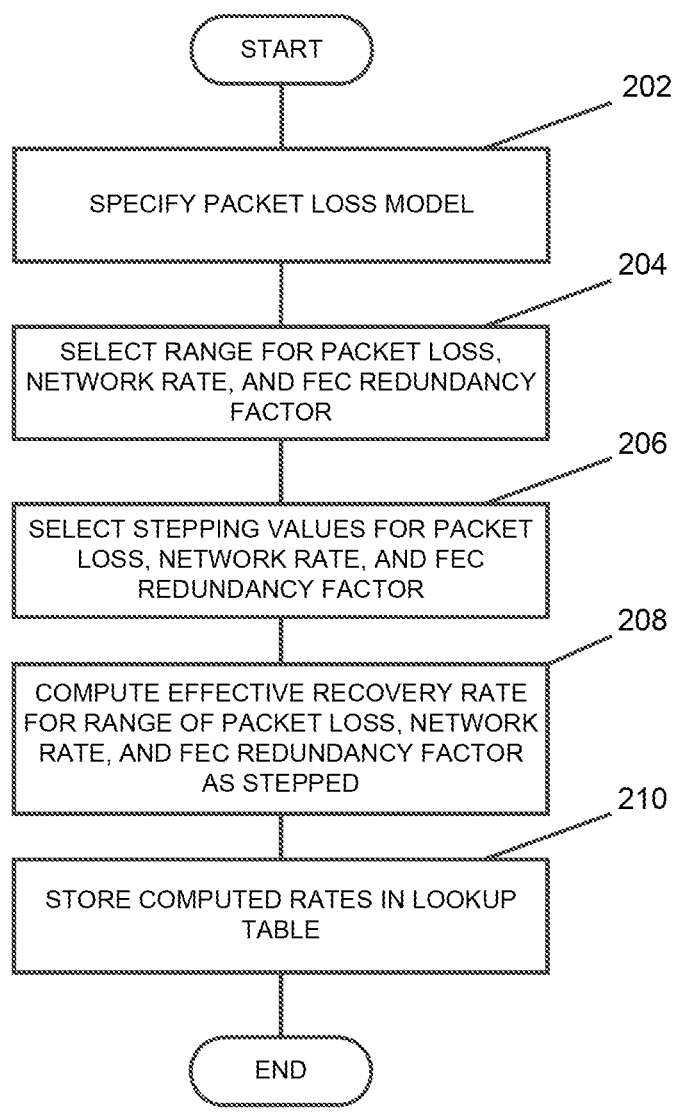
FIG. 2 is a method for generating a Residual Packet Loss (RPL) table in accordance with aspects of the invention.

FIG. 2 is a method 200 for generating an RPL table in accordance with aspect s of the invention. The RPL table includes a set of data describing the effectiveness of FEC code for a given amount of network packet loss and a given network rate. The RPL represents the received packet loss minus the average recovery rate provided by the FEC code. RPL may be defined by the following function:

$$RPL = p - R(p,b,k,n); \quad \text{(Eq. 1)}$$

wherein
RPL is the residual packet loss;
R(p,b,k,n) is the effective recovery rate;
p is the input/received packet loss;
b is the burst length of the packet loss;
k is the total number of source packets; and
n is the total number of packets.

During the optimization process, the quantities (p, b) are input to Equation 1. The quantities may be received periodically as media optimization module 120 receives updated network statistics. The process by which media optimization module 120 performs the table lookup operation is described further below.

The total number of packets n is related to the network bandwidth (total encoding rate) via the function:

$$n = \frac{Rt}{(FR \cdot MTU)}; \text{ wherein} \quad \text{(Eq. 2)}$$

MTU is the maximum network packet size (about 1400 bytes, for example);
Rt is the network rate; and
FR is the average frame rate of the incoming video. The amount of FEC packets is given as n-k.

The FEC redundancy, (Δ, the protection ratio provided by FEC) is defined as:

$$\Delta = \frac{n-k}{n}. \quad \text{(Eq. 3)}$$

Using the above definitions, the residual packet loss may be expressed as:

$$RPL\left(p, b, \frac{Rt}{FR}, \Delta\right) = p - R\left(p, b, \frac{Rt}{FR}, \Delta\right) \quad \text{(Eq. 4)}$$

The three parameters (p,b,Rt) are input to the model to determine an effective recovery rate.

The effective recovery rate R(p,b,Rt/FR,Δ) may be computed for different packet loss scenarios, including random packet loss, bursty packet loss, or constant packet loss. A loss model for the packet loss events is used to determine the effective recovery rate based upon the packet loss, the number of source packets and the number of FEC packets. Different loss models, such as a random packet loss model, a bursty packet loss model, or a consistent packet loss model, may result in different effective recovery rates. For the purposes of notational simplicity, a random (i.e., non-bursty) loss model is used, removing the term b. In aspects involving a bursty loss model, the term b would be relevant to the calculation of the effective recovery rate. The effective recovery rate is defined as:

$$R\left(p, b, \frac{Rt}{FR}, \Delta\right) = R(p, b, k, n) = \frac{1}{n}\sum_{t=1}^{n} P(t, p, b, n)A(t, k, n); \quad \text{(Eq. 5)}$$

wherein

P(t,p,b,n) is the probability of losing t packets (from n total packets), given the packet loss rate p and the burst length b, and A(t,k,n) is the average number of packets that can be recovered when t packets (from n total packets) are lost.

As mentioned above, $$n = \frac{Rt}{(FR \cdot MTU)} \text{ and } \Delta = \frac{(n-k)}{n}.$$

The quantity A(t,k,n) is the average number of packets that can be recovered from the FEC when t packets are lost, and can be obtained directly from counting possible loss configurations given the FEC code. The quantity P(t,p,b,n) is the probability of losing t packets, which depends on the packet loss model. Example models for the packet loss events are random loss (Bernoulli process), or bursty model (two-state Markov process). Other more complicated packet loss models may be used. The feedback of the network state is obtained periodically and is typically an effective packet loss rate p and possibly a burst length b.

The RPL table is computed by determining the effective recovery rate R over a range of the parameters it depends on, such as the packet loss p, network rate $\frac{Rt}{FR}$ and the FEC redundancy factor Δ. In some aspects, the table is generated by computing the RPL functions for a range of each of these factors. An example of such a table follows, where Rt is a selected packet loss model.

TABLE 1

| Packet Loss | Bit Rate | FEC Redundancy | Effective Recovery Rate | Residual Packet Loss |
|---|---|---|---|---|
| $P_1$ | $\frac{Rt}{FR_1}$ | $\Delta_1$ | $R_1 = R\left(p_1, b_1, \frac{Rt}{FR_1}, \Delta_1\right)$ | $RPL\left(p_1, b_1, \frac{Rt}{FR_1}, \Delta_1\right) = p_1 - R_1$ |
| $P_2$ | $\frac{Rt}{FR_2}$ | $\Delta_2$ | $R_2 = R\left(p_2, b_2, \frac{Rt}{FR_2}, \Delta_2\right)$ | $RPL\left(p_2, b_2, \frac{Rt}{FR_2}, \Delta_2\right) = p_2 - R_2$ |

Method 200 determines an effective recovery rate and residual packet loss for a particular packet loss model. The effective recovery rate is based upon possible input values for packet loss, packet loss burst length, number of source packets and number of overall packets. The effective recovery rates and RPL values may be stored in a lookup table for use in the video and FEC lookup table generation process (see FIGS. 3-4) and the media optimization process (see FIG. 5).

At block 202, a packet loss model is specified. The packet loss model is associated with a particular effective recovery rate R. The packet loss model describes network behavior as a result of various factors, such as the recovery rate and resistance to packet loss of a set of data transmitted with given parameters. Although method 200 is described with respect to a single packet loss model, method 200 may also compare recovery rates over multiple models.

At block 204, a range for packet loss values, network rate values and FEC redundancy factor values is selected. For example, the packet loss values p may be computed for a range from 0% packet loss to 50% in steps of 1%, the network rate values $\frac{Rt}{FR}$ may be calculated from 10 kilobits to 500 kilobits in steps of 10 kilobits, and the FEC redundancy factor value A may be computed from 0% redundancy to 50% redundancy in steps of 1%. These exemplary ranges represent one possible aspect of the invention, and other ranges could be used as appropriate. For example, the packet loss may be incremented in 0.5%, 10% or 2% steps. Further, the bit rate may be incremented from 25 through 1000 kilobits in 5 kilobit increments. As an even further example, the FEC redundancy factor may be incremented in 0.5%, 10% or 2% steps.

At block 206, a stepping value for each of the packet loss, network rate and FEC redundancy factor is selected. A smaller stepping value may result in more values for the RPL function present within the data table. In this regard, a more accurate representation of the RPL function for a given dataset may be provided. As described above, for example, the packet loss values may be stepped in 1% increments, 2% increments or 5% increments. For example, the network rate may be stepped in 1 kilobit increments, 10 kilobit increments, or 25 kilobit increments. For example, the FEC redundancy factor may be stepped in 1% increments, 2% increments or 5% increments. In some aspects, a burst parameter b is further included in the table to model for different types of packet loss.

At block 208, an effective recovery rate for each of the stepping values for packet loss, network rate and FEC redundancy factor is calculated. An effective recovery rate for each possible combination of packet loss, network rate and FEC redundancy value is calculated to be stored in the data table.

At block 210, the effective recovery rates and associated residual packet loss values are stored in a lookup table, such as the RPL table. The lookup table is indexed by the packet loss, network rate and FEC redundancy factors that determined each effective recovery rate and residual packet loss value. The RPL table is thus indexed by packet loss, bit rate and FEC redundancy to provide a set of values for the effective recovery rate and RPL. In some aspects, the RPL table may be associated with multiple packet loss models, and each model may include a separate further table for looking up effective recovery rates.

Figure 3:
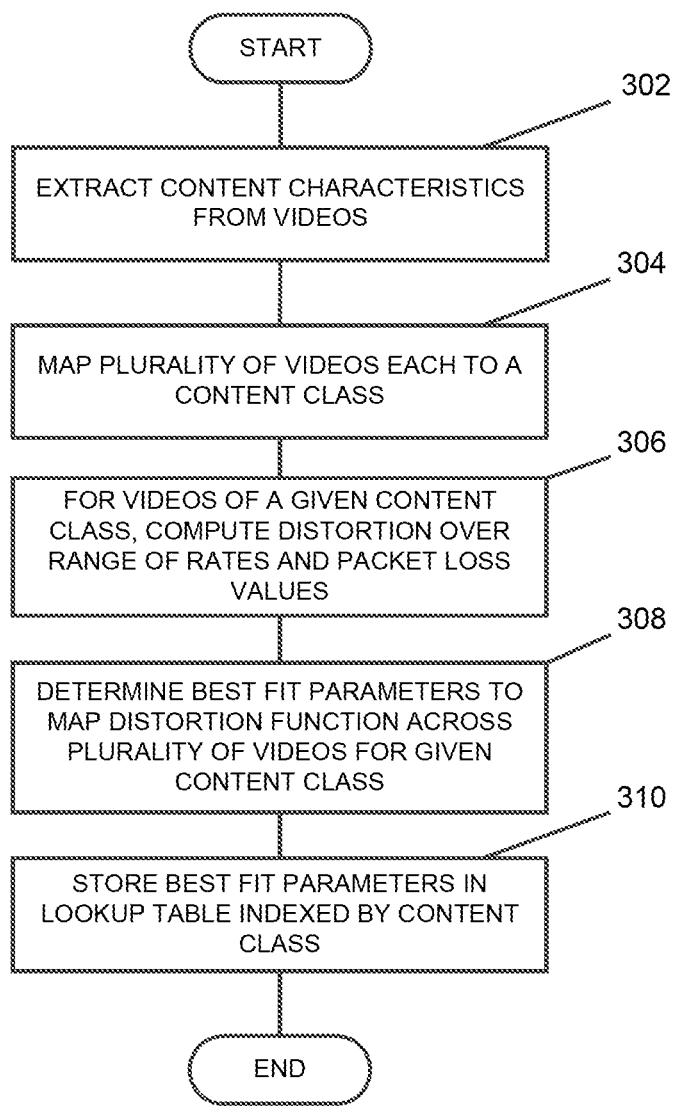
FIG. 3 is a method for generating a video model parameter table in accordance with aspects of the invention.

FIG. 3 is a method 300 for generating a video model parameter table in accordance with aspects of the invention. Method 300 determines a set of optimal parameters to determine a distortion function for a given content class of video. Videos are classified as a particular content class based upon various characteristics, such as the amount of motion in the video, the resolution of the video, a spatial texture level of the video, the color depth of the video, and the like. Once generated, the lookup table may be used to determine an optimal set of parameters to best fit simulated distortion values of a given content class of videos to a distortion function. These parameters are stored in the lookup table for use in the FEC lookup table generation process (see FIG. 4) and the media optimization process (see FIG. 5).

Method 300 begins at block 302, with a plurality of video clips. The video clips are analyzed to extract a set of characteristics of the videos. For example, the videos may be given ratings for the spatial resolution of the video, the frame rate of the video, the amount of motion in the video, the spatial texture level of the video, or the color depth of the video. In some aspects, shorter segments of each video may be analyzed independent of the entire clip. In some aspects, the characteristics are extracted from the video using a preprocessor. For example, the video may be analyzed to determine a motion level. The motion level may be determined by averaging the magnitude of all non-zero motion vectors for each analyzed frame. This averaged value is denoted as the MotionMag of the video. The motion vectors for the input frame may be computed from a pre-processing of the input. A motion level may be defined by its relation to a threshold value. For example, the video may be given a motion level of 2 if MotionMag is greater than or equal to 1.5, a motion level of 1 if MotionMag is between 1.5 and 0.25, and a motion level of 0 if MotionMag is less than or equal to 0.25. A system and method for pre-processing of video to extract motion levels and other characteristics is described in related U.S. application Ser. No. 13/097,267, filed Apr. 29, 2011, published as U.S. Publication No. 2012/0275511 A1, which is herein incorporated by reference in its entirety. The characteristics are associated with the particular video clip that they were extracted from, and method 300 proceeds to block 304.

At block 304, the video clips are associated with a particular content class. A content class corresponds to one or more of the characteristics extracted at block 302. For example, a given video may be mapped to a content class of all videos with a 640×480 resolution, all videos with a particular motion level, or all videos with a 1920×1080 resolution, a particular motion level, and a 16 bit color depth.

At block 306, a video codec is simulated and mean-square error (MSE) distortion values are computed for each video of a given content class over a range of simulated network rates, packet loss values and FEC redundancy factors. This simulation may be performed using an error resilience setting associated with the particular video codec. The error resilience setting determines the amount/percentage of macroblock intra-coding on the intermediate frames of the video. The more intra-coding, the more resilient the video is to packet loss. The error resilience of a given video is determined based on the effective recovery rate associated with the simulated values for packet loss, network rate, FEC value and the motion level of the video. In one aspect, the ER setting is determined as ER=p−μ(ML)R where p is the network packet loss, R is the effective recovery rate defined above and μ(ML) modulates the setting based on the motion level ML in the scene. This function allows for control of the ER for sources with different motion content. For example, μ(ML) may equal 1 for ML=0, μ(ML) may equal 0.5 for ML=1, and μ(ML) may equal 0.25 for ML=2. In another aspect, the ER setting may be the RPL scaled with a motion level parameter such that ER=$\mu_2$(ML)RPL where $\mu_2$ is smaller for lower motion levels and larger for higher motion levels. The distortion values for each simulated set of variables are stored and associated with the video content analyzed as part of the content class.

At block 308, the best model parameters for each content class are extracted. These parameters are extracted by fitting the distortion values of the videos of the content class to a distortion function. The model parameters of the distortion function may describe the contributions to the distortion from various effects, such as (1) intrinsic coding distortion (coding artifacts in absence of packet loss, (2) distortion changes from ER settings (more intra-blocks generally trades off quality with robustness and (3) distortion from actual packet loss. For example, the model distortion function may be:

$$J = D = \alpha_i R_s^{\beta_i} + f(ML)\gamma_i RPL; \qquad \text{(Eq. 6)}$$

wherein
D is the distortion function;
Rs is the source encoding rate related to the network rate and FEC redundancy as $R_S = Rt(1-\Delta)$;
f(ML) is a weight value based on the motion level ML of the video;
RPL is the residual packet loss associated with the simulated parameters, and
$\alpha_i$, $\beta_i$, and $\gamma_i$ are the model parameter values.

The first two parameters may capture the intrinsic coding distortion and effects of ER, while the third parameter may describe additional distortion from the effects of packet loss, for a best fit of the distortion values over a range of simulated values for packet loss, network rate and FEC redundancy factor. The weight value for motion level may be determined by associating a particular weight with each motion level, such as 1 for a motion level of 0, 1.5 for a motion level of 1, or 2.0 for a motion level of 2. In this manner, the distortion function is weighted to compensate for the fact that videos with more motion are more susceptible to distortion as a result of packet loss. Although the methods described herein are described with respect to a particular distortion function, it could also be applied to other distortion functions that model for different network interactions. For example, in addition to taking into account the motion level, the distortion function may factor in effects of color distortion. An example could include a weighted distortion function, with different weights for each color component.

As a further example of an alternate distortion model, if NACK is enabled on the network, the total distortion or cost function might be modified to incorporate a delay term as follows:

$$J = \alpha R_s^\beta + g\left(\frac{RTT}{T_{rtt}}\right) f(ML)\gamma RPL + \frac{1}{W}(T_{nack} + T_{fec}); \qquad \text{(Eq. 7)}$$

wherein w is the average wait time before a frame can be rendered on the receiver;
$L_{nack}$ is the delay associated with sending a NACK notification; and
$T_{fec}$ is the delay associated with the redundant transmission of FEC packets. The quantity RTT is the network roundtrip time, and $$g\left(\frac{RTT}{T_{rtt}}\right)$$

is a smooth function that varies from a small number (<<1) for RTT smaller than some threshold $T_{rtt}$, and increases close to 1 as RTT increases to $T_{rtt}$. This threshold parameter $T_{rtt}$ is application dependent, but in some examples may be about equal to 100 ms, 200 ms, 250 ms, or the like. The meaning of the third term in Equation 7 is that for small waiting time w, the third term becomes large and so the cost of the delay is important in the cost function (i.e., decoder/receiver does not want to wait). If the waiting time w is large, then the cost of delay from NACK and FEC is less important to the total cost function (i.e., decoder/receiver can afford to wait).

At block 310, method 300 stores the model parameters $\alpha_i$, $\beta_i$, and $\gamma_i$ in a lookup table indexed by the content class with which they are associated. In this manner, method 300 generates a lookup table for given model parameters as associated with a particular content class of video. A video parameter lookup table as generated by method 300 might have a structure similar to the table below:

TABLE 2

| Resolution | Motion Level | α | β | γ |
|---|---|---|---|---|
| 640 × 480 | 0 | $\alpha_1$ | $\beta_1$ | $\gamma_1$ |
| 640 × 480 | 1 | $\alpha_2$ | $\beta_2$ | $\gamma_2$ |
| 1920 × 1080 | 0 | $\alpha_3$ | $\beta_3$ | $\gamma_3$ |
| 1920 × 1080 | 1 | $\alpha_4$ | $\beta_4$ | $\gamma_4$ |

In this example, the content class is defined by the resolution and motion level of the video. This table may be used to look up the parameters $\alpha_i$, $\beta_i$, and $\gamma_i$ associated with a video of a given resolution and motion level. Method 300 ends after constructing the table for all content classes.

Figure 4:
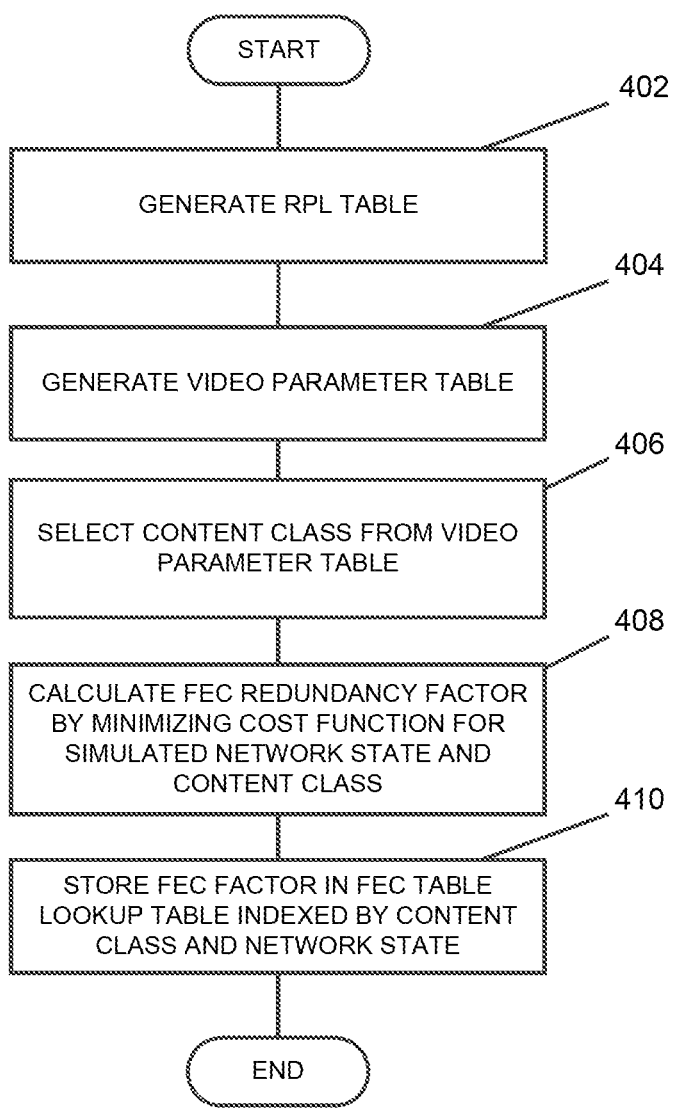
FIG. 4 is a method for generating a forward error correction (FEC) table in accordance with aspects of the invention.

FIG. 4 is a method 400 for generating a FEC table in accordance with aspects of the invention. Method 400 operates to create a lookup table including optimal FEC values for different content classes of videos and network state parameters. Although an increase in the FEC value results in an increased ability of the receiver/decoder to retrieve or compensate for lost packets, the extra data transmitted results in less actual frame data being transmitted to the receiver. In situations where the network is not losing packets, extra FEC results in a lower data bit rate due to the transmission of redundant data. As such, it is necessary to optimize the FEC factor based on the content of the video (i.e., how much can the video afford to lose a particular frame) and the network bit rate and packet loss (i.e., the cost overhead in transmitting redundant data). As such, the FEC factor is determined as a function of both video content and network factors.

At block 402, an RPL table is generated, such as by the method described with respect to FIG. 2. The RPL table is a table of values that describe an RPL value associated with particular values of packet loss, network rate, forward error correction, and the like. At block 404, a video parameter table is generated, such as by method 300 of FIG. 3. The video parameter table is a table indexed by video content classes to define a set of parameters for associating a particular video with a particular cost function. The parameters define the cost function.

At block 406, a content class is selected from the video parameter table. The content class defines a cost function, such as the cost function $D = \alpha_i R_S^{\beta_i} + f(ML)\gamma_i RPL$ described above, where the parameters $\alpha_i$, $\beta_i$, and $\gamma_i$ are numerical values associated with the particular content class. As above, the cost function could also be the alternate cost function associated with NACK, or any other cost function.

At block 408, an optimal FEC factor is calculated as a function of the content class and a set of simulated network statistics. The optimal FEC factor is calculated by determining a minimum of the cost function, such as the cost function D, for a given set of simulated network statistics. The content classes defined within the video parameter table have an optimal FEC factor calculated for each possible set of network statistics, such as network packet loss, network rate and round trip time. Taking the minimum of the cost function in this manner ensures that the method compensates for the cost tradeoffs associated with increased FEC protection. Since the RPL is a function of the FEC protection factor and the network parameters, there is a dependency of the protection factor within the cost function. The cost function also depends on the FEC protection factor from the source encoding rate from the first term of Equation 6 or 7, namely $R_S = Rt (1-\Delta)$.

In some aspects, the FEC redundancy factor is computed separately for key (intra) frames and P (delta/prediction) frames. Key frames include an entire image, while P frames include deltas from previous frames. As such, key frames are more important to protect than P frames, so it is important to include extra FEC protection for key frames. For example, a scale parameter greater than 1 may be provided to the FEC factor for key frames, or key frames may be automatically associated with a higher level FEC factor.

At block 410, the FEC factor calculated at block 408 is stored in a FEC table. The FEC table is a lookup table that is indexed by a set of network parameters and a set of content classes of videos. A FEC table generated by method 400 might have a structure as follows, where the table is indexed on the first four columns of Table 3 to determine the FEC protection factor:

TABLE 3

| Network Rate | Packet Loss | Cost Function Parameters | Motion Level | FEC Protection Factor |
|---|---|---|---|---|

Figure 5:
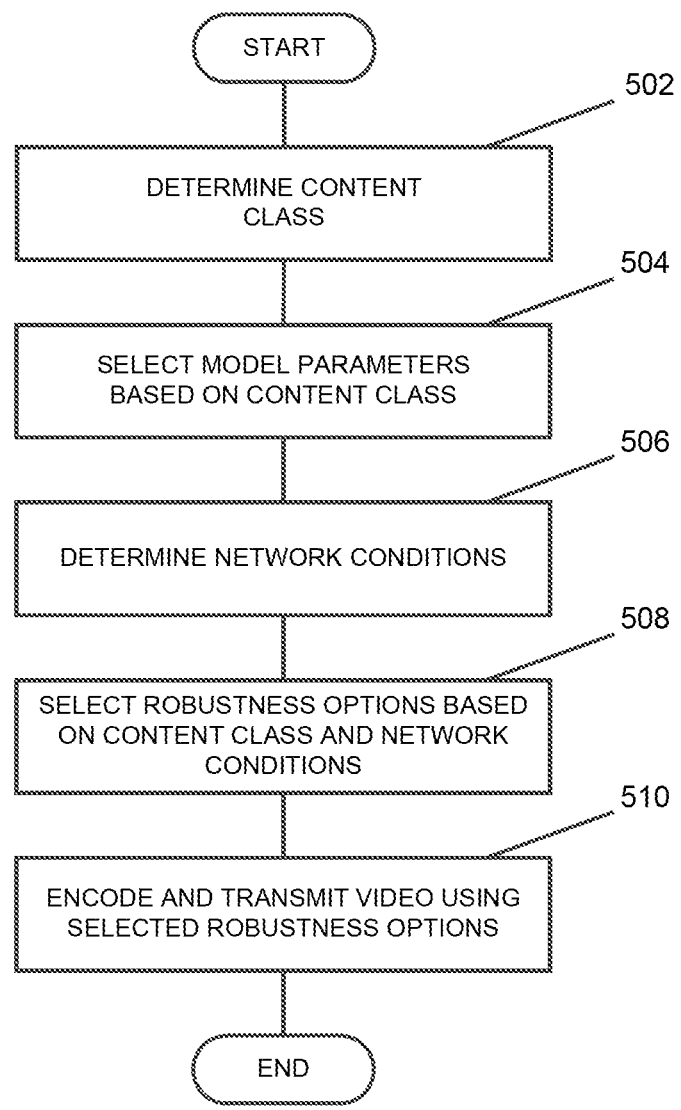
FIG. 5 is a method for providing adaptive media optimization in accordance with aspects of the invention.

FIG. 5 is a method 500 for providing adaptive media optimization in accordance with aspects of the invention. In some aspects, method 500 is performed by a media optimization module such as media optimization module 120. Method 500 is operable to analyze content of a video and statistics from a network and optimize encoding and transmission operations of an encoder module and a network module, respectively, based on the content and statistics. Method 500 provides for efficient analysis such that it is suitable for use in real-time systems.

At block 502, media optimization module 120 determines a content class of a video. The content class is typically determined by analyzing frames of the video for various characteristics, such as the video resolution, frame rate, motion level, spatial texture level and color depth. Each analyzed characteristic may be used to select a particular content class for the video. In some aspects, the content class is determined by a preprocessor that examines the video and sends content class information to media optimization module 120. For example, a given video may have a resolution of 640×480, a frame rate of 30 frames/second and a motion level of 1. In some aspects, the preprocessing operations are performed by capture module 114.

At block 504, media optimization module 120 selects a set of model parameters based on the content class of the video determined during block 502. The content class is determined as discussed above, by analyzing frames of the video for various characteristics, such as the video spatial resolution, frame rate, motion level, spatial texture level and color depth. To obtain the video parameters, for example, the video content described with respect to block 502 would be looked up in the table by finding the values associated with a 640×480 resolution, a 30 frames/second frame rate and a motion level of 1. These values might direct the method to the set of model parameters $\alpha_i$, $\beta_i$, and $\gamma_i$ as associated with a distortion function D for the content class.

At block 506, media optimization module 120 determines a set of network characteristics. The network characteristics may include a packet loss value, a round-trip time to a receiver, a network rate, and the like. In some aspects, these network characteristics are determined using Real-Time Transport Control Protocol (RTCP). RTCP is a network protocol that can be used to provide feedback on network quality, including the network characteristics described above. In some aspects, media optimization module 120 is responsible for creating and receiving RTCP requests. In some aspects, the RTCP requests and the data received in response may be provided by another aspect of computer system 104, such as network module 114.

At block 508, robustness options for the encoding and transmission of the video are selected in response to the network conditions and the identified distortion function parameters. The robustness options are selected by performing table lookups on an RPL table and a FEC table, such as the RPL table generated by method 200 and the FEC table generated by method 400. The FEC table provides for a FEC factor based on the network statistics and the model parameters. The FEC factor may then be used to perform a lookup operation on the RPL table, where error resilience settings are determined as a function of the network statistics, the FEC factor and the motion level of the scene. The FEC factor and the network rate determine the encoding source rate, because the more of the network rate that is consumed by FEC protection, the less can be devoted to transmission of the source video. As such, method 500 also optimizes the source rate as a function of the determined FEC factor, network rate and video content. The FEC factor and ER settings determine the maximum source rate, because the more of the network rate that is consumed by error correction and avoidance methods, the less can be devoted to transmission of the source video. As such, the method also optimizes the source rate as a function of the determined FEC factor and ER setting.

At block 510, the FEC factor, the ER setting and the source rate determined at block 508 are used to optimize the encoding and transmission of the video. The optimization process is described further below with reference to FIG. 6.

The stages of the illustrated methods described above are not intended to be limiting. The functionality of the methods may exist in a fewer or greater number of stages than what is shown and, even with the depicted methods, the particular order of events may be different from what is shown in the figures.

Figure 6:
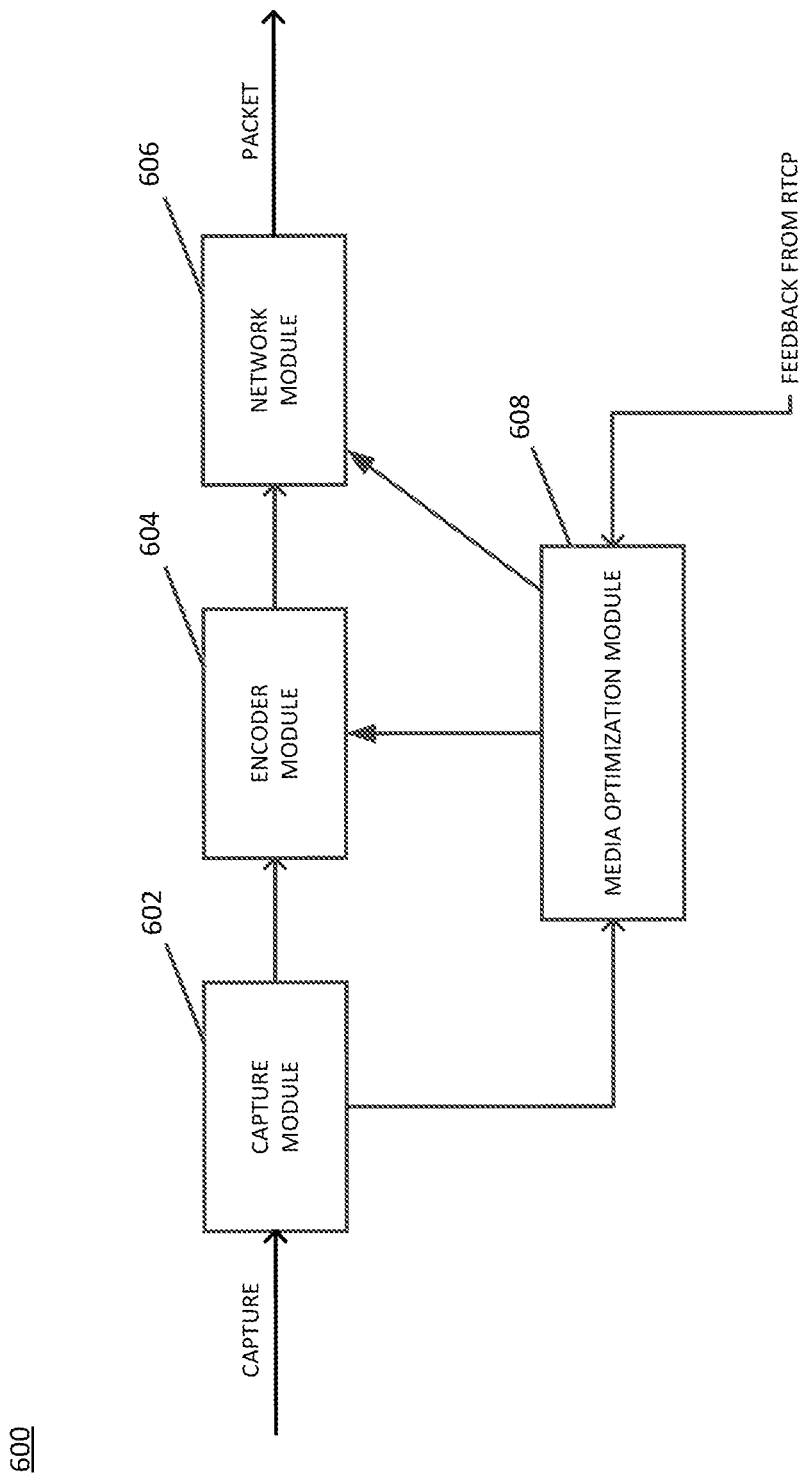
FIG. 6 is a block diagram depicting data flow throughout a system for providing adaptive media optimization in accordance with aspects of the invention.

FIG. 6 is block diagram depicting data flow throughout a system 600 for providing adaptive media optimization in accordance with aspects of the invention. System or apparatus 600 includes a capture module 602, an encoder module 604, a network module 606 and a media optimization module 608.

Capture module 602 receives a video capture from a video source, such as video source 102. As described above, the source may be any type of device capable of supplying a video file or stream. Capture module 602 performs an analysis of the content of the video and sends the analysis to media optimization module 608. The analysis includes various content characteristics of the video, such as the frame rate, the resolution, the motion level, the spatial texture level, the color depth, and the like. As described above, capture module 602 may transmit the unencoded video directly to media optimization module 608, and media optimization module 608 may perform the content analysis. Media optimization module 608 uses the characteristic analysis to determine a content class of the video. The content class is then used to perform a lookup operation to determine a set of distortion model parameters for the video.

Media optimization module 608 also receives a set of network statistics, such as from RTCP. The network statistics are used in conjunction with the distortion model parameters to map the video and network state to a FEC factor and ER setting. The FEC and ER setting are determined by a lookup operation on the FEC table, the RPL table and the motion level of the scene. The FEC factor and network statistics are then used to determine an ER setting in an RPL lookup table. After determining the FEC factor and ER settings for the video, media optimization module 608 determines the encoding source bit rate for the video by subtracting the rate needed to preserve the FEC factor from the maximum/allowed network transmission bit rate. In some aspects, media optimization module 608 may also control whether NACK is used, based upon the distortion function associated with the video content class. In some aspects, whether NACK is used is a setting as configured by the user. In such cases, different lookup tables may be provided for distortion models that account for NACK being enabled.

Media optimization module 608 sends the determined source rate and ER setting to encoder module 604 to encode the video with these settings. Media optimization module 608 sends the determined FEC factor to network module 606 to ensure the video is transmitted with the determined FEC factor.

Encoder module 604 encodes the video with the settings as specified by media optimization module 608. After encoding the video, encoder module 604 sends the encoded video to network module 606.

Network module 606 packetizes and transmits the encoded video in accordance with the FEC protection settings as specified by media optimization module 608. In some aspects, network module 606 also receives instructions from media optimization module 608 to enable NACK. The video is sent to the receiver from network module 606 as one or more packets.

Embodiments of the teachings described herein advantageously provide optimized encoding and transmission of video. By analyzing the video for a content class, mapping the content class to a particular distortion function, and using network statistics to determine optimal transmission and encoding settings, an optimal mix of video robustness and quality is provided. By accounting for the effect that various network settings have on different types of video, it is ensured that the video is encoded and transmitted efficiently.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.," "including," and the like) should not be interpreted as limiting the invention to the specific examples; rather, the examples are intended to illustrate only some of many possible embodiments.

What is claimed is:

1. An apparatus, comprising:
   memory; and
   a processor configured to execute instructions stored in the memory to:
   determine a content class of a portion of a video stream based on one or more content characteristics of the portion of the video stream;
   determine a set of network statistics for a network over which the video stream is to be transmitted;
   configure at least one encoding setting used to encode the portion of the video stream into a format for packetization using at least one lookup table mapping the content class and at least one network statistic of the set of network statistics to the at least one encoding setting;
   configure at least one transmission setting used to packetize and transmit the video after encoding using at least one lookup table mapping the content class and at least one network statistic of the set of network statistics to the at least one transmission setting;
   encode the portion of the video stream in accordance with the at least one encoding setting; and
   transmit the encoded portion of the video stream in accordance with the at least one transmission setting.

2. The apparatus of claim 1 wherein the at least one encoding setting includes an error resilience (ER) setting that forces intra-coding of blocks within a frame of the video that includes blocks to be encoded using inter-prediction.

3. The apparatus of claim 2 wherein the ER setting is determined as a function of a packet loss value, an effective recovery rate and the content class.

4. The apparatus of claim 2 wherein the processor is configured to configure the ER setting using a residual packet loss (RPL) lookup table and a source motion level, wherein the source motion level is based on the content class.

5. The apparatus of claim 1 wherein the at least one transmission setting includes a forward error correction (FEC) factor that indicates a level of forward error correction to be applied to the portion of the video stream.

6. The apparatus of claim 5 wherein the at least one transmission setting includes a negative-acknowledgement (NACK) setting indicating whether or not to use a NACK to verify that packets of the encoded portion of the video stream have been received by a decoder.

7. The apparatus of claim 1 wherein the processor is configured to determine the content class of the portion of the video stream by looking up the one or more content characteristics in a video parameter lookup table that indexes the one or more content characteristics to each of a plurality of content classes for the video stream.

8. The apparatus of claim 7 wherein the one or more content characteristics comprises at least one of a frame rate of the video stream, a resolution of the portion of the video stream, a spatial texture level of the portion of the video stream or a color depth of the portion of the video stream.

9. The apparatus of claim 1 wherein the processor is configured to configure the at least one encoding setting by selecting a source encoding rate based upon a maximum network rate, a forward error correction (FEC) factor that indicates a level of forward error correction to be applied to the portion of the video stream and an error resilience (ER) setting that forces intra-coding of blocks within a frame of the video that includes blocks to be encoded using inter-prediction.

10. The apparatus of claim 1 wherein the processor is configured to configure the at least one transmission setting by performing a table lookup of a forward error correction (FEC) table indexed by the set of network statistics and the content class of the portion of the video stream.

11. The apparatus of claim 1 wherein the set of network statistics comprises a packet loss value, a round trip time value and a network rate.

12. A method, comprising:
 determining a content class of a portion of a video stream based on one or more content characteristics of the portion of the video stream;
 determining a set of network statistics for a network over which the video stream is to be transmitted;
 configuring at least one encoding setting used to encode the portion of the video stream into a format for packetization using at least one lookup table mapping the content class and at least one network statistic of the set of network statistics to the at least one encoding setting;
 configuring at least one transmission setting used to packetize and transmit the video after encoding using at least one lookup table mapping the content class and at least one network statistic of the set of network statistics to the at least one transmission setting;
 encoding, using a processor, the portion of the video stream in accordance with the at least one encoding setting; and
 transmitting the encoded portion of the video stream in accordance with the at least one transmission setting.

13. The method of claim 12 wherein the at least one encoding setting includes an error resilience (ER) setting that forces intra-coding of blocks within a frame of the video that includes blocks to be encoded using inter-prediction.

14. The method of claim 13 wherein the ER setting is determined as a function of a packet loss value, an effective recovery rate and the content class.

15. The method of claim 13 wherein configuring the at least one encoding setting comprises configuring the ER setting using a residual packet loss (RPL) lookup table and a source motion level, wherein the source motion level is based on the content class.

16. The method of claim 12 wherein the at least one transmission setting includes a forward error correction (FEC) factor that indicates a level of forward error correction to be applied to the portion of the video stream.

17. The method of claim 16 wherein the at least one transmission setting includes a negative-acknowledgement (NACK) setting indicating whether or not to use a NACK to verify that packets of the encoded portion of the video stream have been received by a decoder.

18. The method of claim 12, further comprising:
 determining the content class of the portion of the video stream by looking up the one or more content characteristics in a video parameter lookup table that indexes the one or more content characteristics to each of a plurality of content classes for the video stream.

19. The method of claim 12 wherein configuring the at least one encoding setting comprises selecting a source encoding rate based upon a maximum network rate, a forward error correction (FEC) factor that indicates a level of forward error correction to be applied to the portion of the video stream and an error resilience (ER) setting that forces intra-coding of blocks within a frame of the video that includes blocks to be encoded using inter-prediction.

20. The method of claim 12 wherein configuring the at least one transmission setting comprises performing a table lookup of a forward error correction (FEC) table indexed by the set of network statistics and the content class of the portion of the video stream.

* * * * *